United States Patent Office 3,067,003
Patented Dec. 4, 1962

3,067,003
PROCESS FOR THE MANUFACTURE OF CATALYSTS SUITABLE TO POLYMERIZE ETHYLENE AND ALPHA-OLEFINS
Egon Wiberg and Robert Hartwimmer, Munich, Germany, assignors to Farbwerke Hoechst Aktiengesellschaft vormals Meister Lucius & Brüning, Frankfurt am Main, Germany, a corporation of Germany
No Drawing. Filed Oct. 21, 1958, Ser. No. 768,572
Claims priority, application Germany Oct. 23, 1957
11 Claims. (Cl. 23—14.5)

The present invention relates to a process for the manufacture of heavy metal catalysts suitable to polymerize ethylene and alpha-olefins.

It is known to polymerize olefins under relatively mild reaction conditions to obtain higher molecular products. Said polymerization is carried out in the presence of catalyst mixtures containing organo-metal compounds and salts of Ti, Zr, Hf, V, Nb, Ta, Cr, Mo, W, Th and U. The organo-metal compounds used are compounds of the elements of main groups I–III of the periodic table and of zinc. (Cf. "Angewandte Chemie" 67, 541 (1955) and Belgian Patents 533,362, 534,792 and 534,-888.) Said catalyst mixtures are called low pressure polymerization catalysts according to Ziegler, or briefly Ziegler catalysts.

The aforesaid catalysts are mostly prepared by mixing the two catalyst components mentioned. It is of advantage, however, to separate, as described in Belgian Patent 545,087, the heavy metal compounds formed in the catalyst mixtures by reduction from the other reaction products of said mixture and to use them for the polymerization in any combination with organo-metal compounds, for example of aluminum. The reduced heavy metal compounds thus obtained always contain organo-metal compounds originating from the preparation which cannot be removed even by frequent washing and which impair sometimes a subsequent controlled olefin polymerization.

Now we have found that the Ziegler heavy metal catalysts suitable for polymerizing ethylene and alpha-olefins to yield high molecular polymers can be obtained free from organo-metal compounds by reacting the halogen compounds of the higher valence stages of Ti, Zr, Hf, V, Nb, Ta, Cr, Mo, W, Th or U with compounds which contain at least one metal-metal bond of the elements of main group IV of the periodic table as far as they have an atomic weight of at least 28. The halogen compounds of higher valence stages suitable in the process of the present invention are compounds in which the metal is bound with at least part of its valences directly to halogen atoms and which can be reduced to a compound of lower valence by reacting them with the compounds mentioned of elements of group IV. Particularly suitable halogen compounds of this kind are $TiCl_4$, $VCl_4$ and $VOCl_3$.

The compounds of the elements of main group IV of the periodic table which may be used in the process of the present invention as reducing agents for the halogen compounds can be characterized by the following general formula $$X_3M(X_2M)_nMX_3$$

in which M stands for the same or different elements of main group IV of the periodic table having an atomic weight of at least 28, X represent an alkyl radical of up to 6 carbon atoms, an alkoxy radical of up to 6 carbon atoms, an aryl radical, an aryloxy radical or a halogen atom and $n$ signifies an integer in the range from 0 to 3. As suitable compounds there may be mentioned hexaethyl-distannane, hexabutyl-distannane, hexa-n-hexyl-distannane, hexabutyl-disilane, hexa-n-hexyl-disilane, hexaethoxy-disilane, hexachloro-disilane, dichlorotetra-ethoxy-disilane, tetrachloro-diethoxy-disilane, octaethoxy-trisilane, octachloro-trisilane, trichloro-pentaethoxy-trisilane, decachloro-tetrasilane, dodecachloro-pentasilane. It is possible, of course, to use in the process of the invention compounds of different metals, for example of the types $X_3Si$—$SnX_3$, $X_3Si$—$PbX_3$ or $X_3Sn$—$PbX_3$. The invention which is directed generally to compounds of the above formula shall not be limited or restricted to the above compounds, which indicate only a few of the numerous suitable compounds.

The trialkyl-metal halides thus obtained are readily soluble in hydrocarbons, they do not form with the aforesaid reduced heavy metal compounds complex, addition or inclusion compounds and they can, therefore, be removed quantitatively. The following reaction equation illustrates the formation of the catalyst, for example, from titanium tetrachloride and hexabutyl-distannane.

$$(C_4H_9)_3SnSn(C_4H_9)_3 + 2TiCl_4 \rightarrow 2TiCl_3 + 2(C_4H_9)_3SnCl$$

The reaction can be brought about by mixing the heavy metal compounds with the aforesaid compounds of group IV of the periodic table in pure form or, if desired, in an inert solvent. As solvents there are suitable aliphatic, cycloaliphatic and aromatic hydrocarbons as well as the halogen substitution products thereof such as n-hexane, diesel oil, mixtures of aliphatic hydrocarbons e.g. Sinarol (i.e. a mixture of predominantly aliphatic hydrocarbons having a boiling range between 200 and 220° C.), cyclohexane, decahydronaphthalene, benzene, toluene, xylene, carbon tetrachloride, methylene chloride, dichloro-ethane, butyl chloride, hexyl bromide, cyclohexyl bromide, chlorobenzene or benzyl chloride. The order of succession in which the individual components are added may be varied. In general it is necessary to carry out the reaction with exclusion of air and moisture, that is to say under reduced pressure or in inert gases such as nitrogen. The catalyst is mostly prepared below room temperature, i.e. at a temperature below 20° C., or at room temperature (20–30° C.). In order to accelerate or complete the reaction the reaction mixture may subsequently be heated to higher temperatures of about 50–220° C. and preferably 90–170° C. The reduced heavy metal compound is freed from the reaction products by filtration, centrifugation or another suitable separating method. After having been washed out repeatedly with a suitable inert solvent, for example one of the solvents mentioned above, the catalysts are obtained in the desired pure form.

The catalysts prepared according to the process of the present invention and activated with organo-metal compounds of the elements of main groups I–III and zinc are well suitable for polymerizing ethylene, propylene and other alpha-olefins. The polymerization with a catalyst prepared according to the invention is described in Example 11.

The following examples serve to illustrate the invention but they are not intended to limit it thereto.

Example 1

20 millimols (10 cc.) of hexabutyl-distannane were dissolved in 100 cc. of a hydrogenated diesel oil fraction having a boiling range of 200–230° C. (diesel oil) and the mixture was degassed under reduced pressure. 40 millimols (4.4 cc.) of $TiCl_4$ dissolved in 45.6 cc. of degassed diesel oil were then dropped into the solution by means of a dropping funnel while stirring vigorously. The whitish precipitate initially formed disappeared at the latest after the addition of half the amount of $TiCl_4$ and a fine-grained, medium brown precipitate separated from the mixture. The addition of $TiCl_4$ being terminated, the mixture was vigorously stirred for another 3 hours, the precipitate was separated from the solution by centrifugation and washed repeatedly with diesel oil. The catalyst suspension finally obtained had a content of 0.55 millimol of $Ti^{3+}$ per cubic centimeter corresponding to a conversion of 68.8% in a suspension amount of 50 cc. 27.5 millimols of $TiCl_3$ were obtained (theoretical yield 40 millimols).

The precipitate was free of $Ti^{4+}$ and tin.

Example 2

The experiment was carried out as described in Example 1, but after having dropped in the $TiCl_4$ the mixture was vigorously stirred at room temperature for another 15 hours. The precipitate was then separated by centrifugation and treated as described in the preceding example. The degree of conversion was considerably improved as compared with Example 1. The catalyst suspension obtained was 0.65 molar and consequently contained in 60 cc. of suspension 39 millimols of $TiCl_3$ (theoretical yield 40 millimols). Conversion=97.5%.

Example 3

20 millimols (10 cc.) of hexabutyl-distannane were dissolved in 100 cc. of diesel oil and the mixture was degassed under reduced pressure. The solution was slowly heated to 50° C., while vigorously stirring, and a solution of 40 millimols (4.4 cc.) of $TiCl_4$ in 50 cc. of diesel oil was then dropped into the solution which was kept under reduced pressure. The temperature of the reaction mixture was subsequently raised to 80–90° C. and the suspension was then vigorously stirred at that temperature for two hours. After cooling the fine, brown suspension was centrifuged, the precipitate obtained was taken up with fresh diesel oil, well shaken and again centrifuged. After having repeated this procedure five times the fine, brown particles were suspended in 50 cc. of diesel oil and the content of $Ti^{3+}$ was determined by titration. The suspension was 0.75 molar and the total amount of $TiCl_3$ was therefore 37.5 millimols (theoretical yield 40 millimols). Rate of conversion=93.8%.

Example 4

A flask having a capacity of 250 cc. was charged with 16.9 cc. (16.32 grams) of hexa-ethoxy-disilane (50 millimols) and rapidly provided with an Anschütz head-piece, a dropping funnel and a reflux condenser. The entire apparatus was then flushed with pure nitrogen and a solution of 10 cc. (91 millimols) of $TiCl_4$ in 100 cc. of Sinarol was dropped in in the cold, while vigorously stirring. A white, crystalline precipitate was formed which did not change any more in the cold. When the mixture was gradually heated to about 120–130° C., the whole precipitate first dissolved again, the limpid solution became rapidly brown and then turbid. In the course of further hours increasing amounts of fine-grained, medium brown titanium trichloride separated gradually. The experiment was terminated after 4–5 hours, the precipitate was separated and carefully washed in known manner repeatedly with benzene or toluene. It was finally taken up in pure Sinarol. The conversion rate amounted to 65–85%.

Example 5

A bomb tube was charged with 5.67 cc. (9.18 grams) of octa-chloro-trisilane (25 millimols) and 8.8 cc. (80 millimols) of titanium tetrachloride were added by means of a pipette. The tube was closed by melting and heated horizontally in a furnace for several hours at 180–220° C. After having cooled, the reaction tube contained a thick magma of violet brown, silky shining particles. The tube was opened, the volatile substances were removed under reduced pressure, the precipitate was taken up in Sinarol and centrifuged again. The precipitate was washed again four to five times with Sinarol in the same manner.

According to the results of the iodometric $Ti^{+++}$ determination there were obtained 70 millimols of $TiCl_3$. Conversion=87.5%.

Example 6

11.34 cc. (18.36 grams) of octa-chloro-trisilane (50 millimols) were mixed with 150 cc. of Sinarol and the mixture was filled into a small autoclave. 16.5 cc. (150 millimols) of titanium tetrachloride were then added by means of a pipette, the mixture was superposed with $N_2$, the autoclave was closed and then heated for several hours at 200° C. while stirring well. After that period and after having cooled the autoclave the reaction mixture was rapidly pipetted out while being kept under nitrogen, the precipitate was separated from the solution by centrifugation and the former was washed several times with pure, fresh Sinarol. Finally the precipitate obtained was suspended in 100 cc. of Sinarol and the content of $Ti^{3+}$ was determined. It amounted to 103 millimols or 1.03 millimols/cc. corresponding to a yield of 68.7%. The catalyst was brown violet and fine-grained.

Example 7

10 grams (about 30 millimols) of a halogeno-ethoxy-disilane having approximately the composition $$Si_2Cl_2(OC_2H_5)_4$$

were diluted with a small amount of xylene and vigorously stirred in a micro-flask by means of a magnetic stirrer. 5.5 cc. (50 millimols) of $TiCl_4$ were then dropped in, while passing through nitrogen, and the mixture was rapidly heated until the solvent boiled vigorously. In the course of several hours a medium brown fine precipitate separated slowly from the dark, red-brown solution. The reaction being terminated the precipitate was treated as described in Examples 4, 5 and 6. 35 millimols of catalyst (70%) were obtained which was fine-grained and medium brown.

Example 8

20 millimols (6 cc.) of hexaethyl-distannane were dissolved in 50 cc. of diesel oil and the mixture was degassed under reduced pressure. 20 millimols (1.9 cc.) of vanadium oxytrichloride dissolved in 25 cc. of Sinarol were then dropped in at room temperature, while stirring under nitrogen. A deep dark-blue precipitate separated immediately. The mixture was stirred for another 15 minutes, the precipitate was filtered off under nitrogen and washed thoroughly with 100 cc. of diesel oil. The reaction product obtained was free of organo-metal compounds. The reaction was quantitative.

Example 9

7 grams (10 millimols) of hexaphenyl-distannane having a melting point of 228–231° C. were melted under a protective gas atmosphere of nitrogen in a trap made of Jena glass and provided with an Anschütz headpiece, a suction tube and a dropping funnel. Then 2 cc. (18.2 millimols) of undiluted $TiCl_4$ were added dropwise to the melt. A vigorous reaction started at once with splashing and boiling while a large amount of a nearly blackish precipitate separated. After having added the whole amount of $TiCl_4$ the mixture was heated for another 15 minutes with reflux of the volatile portions, which crept up with a yellowish green color on the walls of the trap, and the pressure was rapidly reduced at the same high temperature. The volatile portions were removed after a short while and the contents of the trap was dry. It was taken up in Sinarol, manually detached from the walls, dispersed a little, subsequently centrifuged off, taken up as usual 4–5 times in fresh Sinarol and then suspended in 50 cc. of Sinarol. The somewhat coarse-grained precipitate had a distinctly violet color. The determination of the content of the suspension showed a conversion of 68%.

Example 10

8.3 cc. (7 grams) of hexaethyl-disilane (30 millimols) were filled together with about 10 cc. of Sinarol in a bomb tube (or another appropriate pressure vessel). Then there were added by means of a pipette 5.5 cc. (50 millimols) of TiCl₄ with the exclusion of air and moisture. The tube was then closed by melting under reduced pressure and heated for some hours at a temperature within the range of 120 to 200° C. After the experiment had been terminated the reaction vessel contained larger or smaller amounts of brown or brown violet titanium trichloride (depending on the reaction temperature). The tube was opened and the contents was removed by flushing with an abundant amount of degassed Sinarol. The precipitate was washed as described in the preceding examples and stored in the form of a suspension in Sinarol. The yields amounted in this case to about 70–85% of the theory.

*Example 11*

The polymerization of ethylene with the aid of the catalysts prepared according to Examples 1–10 was carried out as follows:

A polymerization vessel (capacity 750 cc.) was charged with 500 cc. of degassed Sinarol and 10 millimols of the catalyst suspension was added by means of a pipette. Nitrogen was passed through the whole apparatus. The nitrogen was then displaced by dry, oxygen-free ethylene, the reaction mixture was heated to 70° C. and vigorously stirred. Then there were added dropwise to the catalyst suspension per batch, about 2.5 to 3 cc. of dimethylaluminum chloride or diethylaluminum chloride dissolved each time in 50 cc. of Sinarol. After an incubation period of 5–7 minutes the ethylene was absorbed with an excellent speed already after the addition of a few drops of R₂AlCl. The absorption speed of ethylene could be maintained at 40–70 liters per hour for a prolonged period by occasionally dropping in further amounts of R₂AlCl. Each experiment was terminated after one hour, the reaction mixture was admixed with 4% of butanol and the pure white polymer was suction-filtered. The dry product was then suspended in corresponding amounts of n-propanol or iso-butanol, a small amount of concentrated hydrochloric acid was added and the mixture was vigorously stirred for 30 minutes at 50° C. After cooling the mixture was suction-filtered, the polymer was afterwashed with a little ethanol and then dried at 90–95° C. in a drying closet.

Depending on the catalyst used there were obtained about 40–50 grams of polyethylene per hour.

We claim:

1. A process for the manufacture of a titanium trichloride catalyst suitable to polymerize α-olefins by a low pressure process when being activated with an organo metallic compound which comprises reacting titanium tetrachloride with hexabutyl-distannane and subsequently separating the solid reaction product which is the desired titanium trichloride catalyst.

2. A process for the manufacture of a titanium trichloride catalyst suitable to polymerize α-olefins by a low pressure process when being activated with an organo metallic compound which comprises reacting titanium tetrachloride with hexaethoxy-disilane and subsequently separating the solid reaction product which is the desired titanium trichloride catalyst.

3. A process for the manufacture of a titanium trichloride catalyst suitable to polymerize α-olefins by a low pressure process when being activated with a organo metallic compound which comprises reacting titanium tetrachloride with octachloro-trisilane and subsequently separating the solid reaction product which is the desired titanium trichloride catalyst.

4. A process for the manufacture of a titanium trichloride catalyst suitable for the low pressure polymerization of alpha-olefins when activated with an organo-metallic compound which comprises reacting TiCl₄ with hexaphenyl distannane and subsequently separating the solid reaction product which is the desired titanium trichloride catalyst.

5. A process for the manufacture of a titanium trichloride catalyst suitable for the low pressure polymerization of alpha-olefins when activated with an organo-metallic compound with comprises reacting TiCl₄ with hexaethyl disilane and subsequently separating the solid reaction product which is the desired titanium trichloride catalyst.

6. A process for the manufacture of a heavy metal catalyst suitable to polymerize alpha-olefins by a low pressure process when activated with an organo-metal compound which comprises reducing a halide of a metal selected from the group consisting of Ti, Zr, Hf, V, Nb, Ta, Cr, Mo, W, Th and U by a reducing agent of the general formula $$X_3M(X_2M)_nMX_3$$

wherein M is an element selected from the group consisting of Si and Sn, X is selected from the group consisting of an alkyl radical, an alkoxy radical with up to 6 carbon atoms, an aryloxy radical and a halogen atom, and $n$ signifies an integer in the range from 0 to 3, said reducing agent having at least one M-to-M linkage which is broken during the reduction process, and subsequently separating the solid reaction product which is the desired heavy metal catalyst.

7. A process for the manufacture of a heavy metal catalyst suitable to polymerize alpha-olefins by a low pressure process when being activated with an organo-metal compound which comprises reducing at a temperature in the range between room temperature and 220° C. a halide of a metal selected from the group consisting of Ti, Zr, Hf, V, Nb, Ta, Cr, Mo, W, Th and U by a reducing agent of the general formula $$X_3M(X_2M)_nMX_3$$

wherein M is an element selected from the group consisting of Si and Sn, X is selected from the group consisting of an alkyl radical with up to 6 carbon atoms, an aryl radical, an alkoxy radical with up to 6 carbon atoms, an aryloxy radical and a halogen atom, and $n$ signifies an integer in the range from 0 to 3, said reducing agent having at least one M-to-M linkage which is broken during the reduction process, and subsequently separating the solid reaction product which is the desired heavy metal catalyst.

8. A process for the manufacture of a heavy metal catalyst suitable to polymerize alpha-olefins by a low pressure process when activated with an organo-metal compound which comprises reducing a compound selected from the group consisting of titanium tetrachloride, vanadium tetrachloride and vanadium oxytrichloride by a reducing agent of the general formula $$X_3M(X_2M)_nMX_3$$

wherein M is an element selected from the group consisting of the group of Si and Sn, X is selected from the group consisting of an alkyl radical with up to 6 carbon atoms, an aryl radical, an alkoxy radical with up to 6 carbon atoms, an aryloxy radical and a halogen atom, and $n$ signifies an integer in the range from 0 to 3, said reducing agent having at least one M-to-M linkage which is broken during the reduction process, and subsequently separating the solid reaction product which is the desired heavy metal catalyst.

9. A process for the manufacture of a heavy metal catalyst suitable to polymerize alpha-olefins by a low pressure process when activated with an organo-metal compound which comprises reducing in an inert organic solvent a halide of a metal selected grom the group consisting of Ti, Zr, Hf, V, Nb, Ta, Cr, Mo, W, Th and U by a reducing agent of the general formula $$X_3M(X_2M)_nMX_3$$

wherein M is an element selected from the group consisting of Si and Sn, X is selected from the group consisting of an alkyl radical with up to 6 carbon atoms, an aryl radical, an alkoxy radical with up to 6 carbon atoms, an aryloxy radical and a halogen atom, and $n$ signifies an integer in the range from 0 to 3, said reducing agent having at least one M-to-M linkage which is broken during the reduction process, and subsequently separating the solid reaction product which is the desired heavy metal catalyst.

10. A process for the manufacture of a heavy metal catalyst suitable to polymerize alpha-olefins by a low pressure process when activated with an organo-metal compound which comprises reducing in an inert organic solvent at a temperature in the range between room temperature and 220° C., a compound selected from the group consisting of titanium tetrachloride, vanadium tetrachloride, and vanadium oxychloride by a reducing agent of the general formula $$X_3M(X_2M)_nMX_3$$

wherein M is an element selected from the group consisting of Si and Sn, X is selected from the group consisting of an alkyl radical with up to 6 carbon atoms, an aryl radical, an alkoxy radical with up to 6 carbon atoms, an aryloxy radical and a halogen atom, and $n$ signifies an integer in the range from 0 to 3, said reducing agent having at least one M-to-M linkage which is broken during the reduction process, and subsequently separating the solid reaction product which is the desired heavy metal catalyst.

11. A process for the manufacture of a heavy metal catalyst suitable to polymerize alpha-olefins by a low pressure process when being activated with an organo-metal compound which comprises reacting a halide of a metal selected from the group consisting of Ti, Zr, Hf, V, Nb, Ta, Cr, Mo, W, Th and U with a compound of an element of main group IV of the periodic table, said element having an atomic weight of at least 28 and said compound having at least one metal-to-metal linkage and being selected from the group consisting of the metal alkyls having up to 6 carbon atoms in each alkyl group, the metal alkoxides with up to 6 carbon atoms in each alkoxide group, the metal aryls, the metal aryloxides and the metal halides, the breaking of the metal-to-metal linkage in the group IV compound occurring during its reaction with the organo-metal compound, and subsequently separating the solid reaction product which is the desired heavy metal catalyst.

References Cited in the file of this patent

UNITED STATES PATENTS

| | | |
|---|---|---|
| 2,721,189 | Anderson et al. | Oct. 18, 1955 |
| 2,820,778 | Spaenig et al. | Jan. 21, 1958 |
| 2,845,414 | Schutze | July 29, 1958 |
| 2,862,917 | Anderson et al | Dec. 2, 1958 |
| 2,868,772 | Ray et al. | Jan. 13, 1959 |
| 2,899,418 | Reynolds | Aug. 11, 1959 |
| 2,910,461 | Nowlin et al. | Oct. 27, 1959 |
| 2,921,054 | Kennedy | Jan. 12, 1960 |
| 2,924,586 | Lotz et al. | Feb. 9, 1960 |
| 2,928,815 | Hammer et al. | Mar. 15, 1960 |